United States Patent [19]

Mostashari

[11] Patent Number: 4,964,120
[45] Date of Patent: Oct. 16, 1990

[54] METHOD OF DETECTING A CABLE FAULT AND SWITCHING TO A REDUNDANT CABLE IN A UNIVERSAL LOCAL AREA NETWORK

[75] Inventor: Scott S. Mostashari, Phoenix, Ariz.

[73] Assignee: Honeywell Inc., Minneapolis, Minn.

[21] Appl. No.: 404,756

[22] Filed: Sep. 8, 1989

[51] Int. Cl.$^5$ .............................................. H04J 1/16
[52] U.S. Cl. ..................................... 370/016; 370/14; 370/85.9
[58] Field of Search ................. 370/14, 16, 85.9, 85.4; 371/8.1

[56] References Cited

U.S. PATENT DOCUMENTS

| | | | |
|---|---|---|---|
| 4,519,070 | 5/1985 | Bell | 370/16 |
| 4,627,045 | 12/1986 | Olson | 370/16 |
| 4,658,396 | 4/1987 | Barden | 370/16 |
| 4,701,910 | 10/1987 | Ulug | 370/85.9 |

Primary Examiner—Douglas W. Olms
Assistant Examiner—Christopher O. Edwards
Attorney, Agent, or Firm—Arthur A. Sapelli; D. J. Lenkszus; A. Medved

[57] ABSTRACT

A method by which the each module of a token passing local area network complying with IEEE standard 802.4 determines if the communication cable from which it is receiving signals is faulty and switches to a second, or redundant cable. Each module transmits the same signals over both cables, but can receive signals from only one, its selected cable. In normal operations, all modules receive signals from the same cable. Each of the modules has the capability of detecting faults in its selected cable, and of switching cables so that its second cable becomes its selected cable. Each module also has the capability of initiating the process or re-establising the network whenever a module switches cables in response to detecting a fault. Each module in response to the process of initiating re-establishing the network, switching cables so that all modules are listening to, or receiving signals from the same cable. Each module periodically checks to determine if low level noise is present on its selected cable, and if it is, the module switches cables. A module in the listen only mode of operation will periodically check to determine if the signals it is receiving or valid. If not, it will switch cables. A module whose redundant cable has been identified as being silent, will periodically check to determine if its redundant cable remains silent.

15 Claims, 4 Drawing Sheets

METHOD OF DETECTING A CABLE FAULT AND SWITCHING TO A REDUNDANT CABLE IN A UNIVERSAL LOCAL AREA NETWORK

RELATED PATENT APPLICATIONS

The present patent application is related to U.S. patent application, Ser. No. 07/402,954, entitled "APPARATUS FOR PROVIDING A UNIVERSAL INTERFACE TO A PROCESS CONTROL SYSTEM", by Amand J. Hahn and Ravinder Bansal, filed on Sept. 5, 1989, the specification of which as filed is set forth in Appendix A of this Application, and assigned to Honeywell Inc., the assignee of the present application, the disclosure of which is hereby incorporated into this application by reference.

BACKGROUND OF THE INVENTION (1) Field of the Invention

This invention is in the field of methods by which each module of a local area network (LAN) satisfying IEEE Standard 802.4 and having redundant cables over which cables the modules of the LAN communicate, detects a fault in a cable from which the module is receiving signals and switches to the redundant cable to receive signals from it.

(2) Description of the Prior Art.

The Institute of Electrical and Electronics Engineers, Inc. (IEEE) has established a standard for Token Passing Local Area Networks, IEEE 802.4. An advantage of a standardized, or universal, token passing LAN result is that users of such a LAN can connect equipment to the LAN supplied by any vendor whose equipment satisfies the IEEE Standard 802.4.

There are presently commercially available devices such as Motorola Inc.'s, MC 68824, "Token Bus Controllers," which implement the Media Access Control (MAC) portion of IEEE 802.4. IEEE 802.4 defines the physical and MAC portions of the data link layer standards of the Manufacturing Automation Protocol (MAP) specification. Also commercially available are Concord Communication, Inc.'s "Carrierband Modular Modems" which are also designed to meet the requirements of IEEE 802.4.

When a LAN is utilized to control an industrial process, reliability of the LAN is a high priority requirement. Reliability of a LAN can be significantly increased by redundancy of the modules, or nodes, of the LAN and the media, over which the modules communicate, such as a coaxial cable.

However, the IEEE 802.4 standard for a token passing LAN is satisfied by a single bus medium such as a bidirectional coaxial cable so that problems associated with the use of redundant cables are not present in such a LAN. Commercially available modems satisfying IEEE 802.4 such as the Concord's "Carrierband Modular Modems" have the capability of transmitting simultaneously over two parallel bidirectional coaxial cables, but they can receive signals from only one of the two cables at any one time. Thus the nodes, or modules, of a token passing LAN satisfying IEEE 802.4 using commercially available token bus controllers (TBC) and modems do not have the capability to determine when either, or both of the redundant cables has a fault, indicated by no signals being received for a predetermined period of time over one of the cables or by the fact that the line or cable is too noisy, so that valid signals, or messages, are not being received properly; and, thus, when a module should switch to the redundant cable.

SUMMARY OF THE INVENTION

The present invention provides a method by which the nodes, or modules, of a token passing local area network complying with IEEE Standard 802.4, and which is provided with a second, or redundant, trunk cable, determines in response to selected interrupt signals produced by a Token Bus Controller (TBC) with which each module is provided when to switch between the two cables from either of which, but not both simultaneously, the module can receive signals. Each module has the capability to transmit concurrently the same signals over both cables of the network bus. In response to a module not receiving any signals from its selected cable for a predetermined period of time, the cable from which it is enabled to receive signals, or to which it is listening, the TBC produces a bus idle timeout interrupt after a predetermined period of time has elapsed. The TBC will also produce a noise/frame fragment interrupt if a predetermined number of bursts of noise exceeding a predetermined noise threshold, or of frame fragments, are detected during a predetermined period of time. The program of this invention causes the modem experiencing these situations to switch or to swap, the cable from which the module is enabled to receive signals. A module will continue to swap or to switch cables to which it is listening until a non-faulty cable is found from which the module can receive valid signals.

It is therefore an object of this invention to provide a method by which the modules of a token passing LAN satisfying IEEE 802.4 and which is provided with redundant cables detects a faulty cable and switches to the second, or redundant, cable.

It is another object of this invention to provide a method by which the modules of a token passing LAN satisfying IEEE 802.4 which network is provided with redundant trunk and drop cables detects when one of the trunk or drop cables is faulty and switches to the redundant cable without requiring physical modifications to the components of each of the modules.

DESCRIPTION OF THE DRAWING

Other objects, features, and advantages of the invention will be readily apparent from the following description of a preferred embodiment thereof taken in conjunction with the accompanying drawings, although variations and modifications may be affected without departing from the spirit and scope of the novel concepts of the disclosure, and in which.

DETAILED DESCRIPTION

Figure 1:
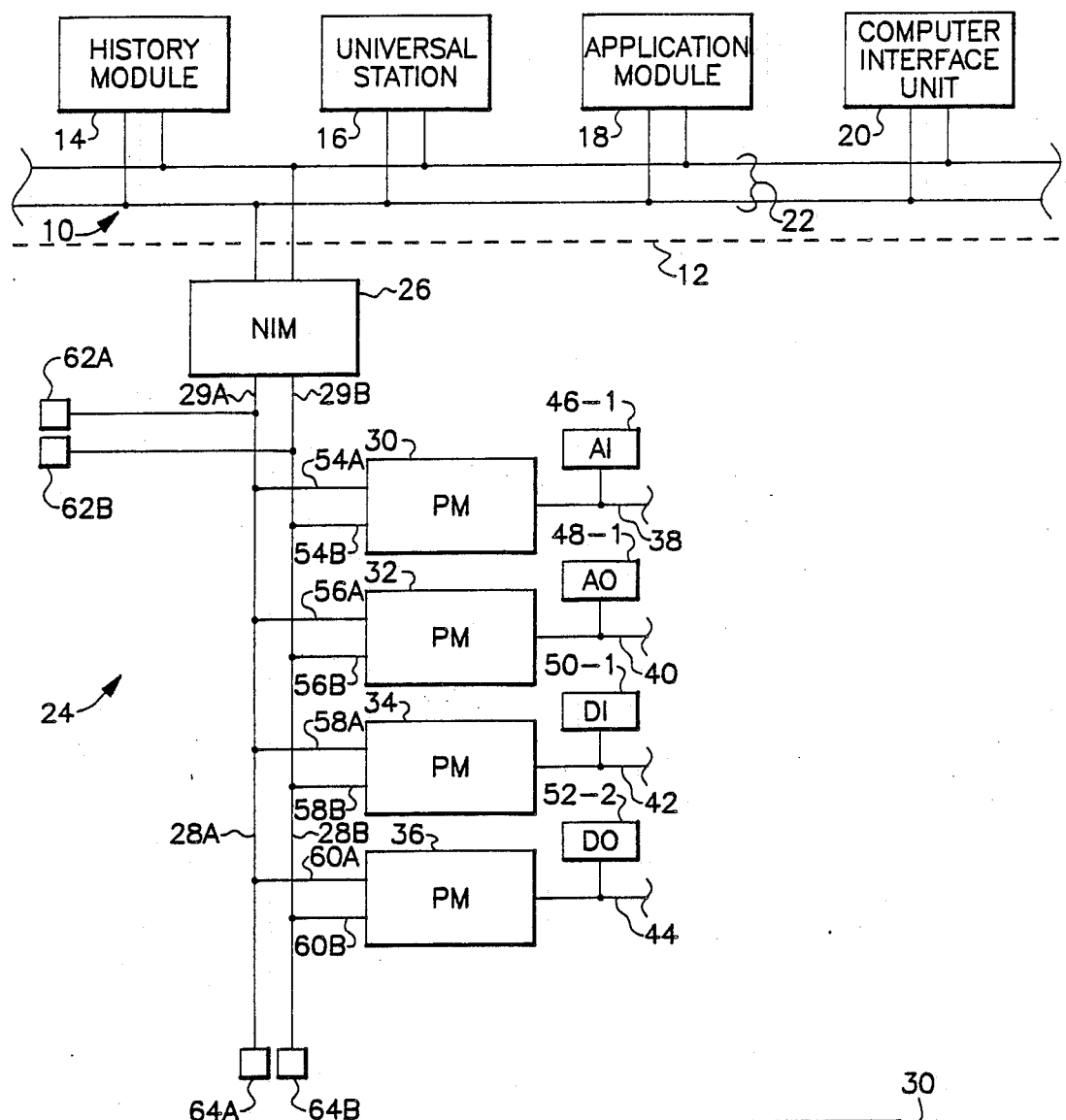
FIG. 1 is a schematic block diagram of a universal token passing local area network (UCN) and of a plant control network (PCN) which is a token passing LAN.

Referring to FIG. 1, plant control network (PCN) 10, the components of which lie above dashed line 12 is a token passing LAN which does not comply with IEEE 802.4 in the preferred embodiment. Modules 14, 16, 18, and 20 have various specialized functions and each is connected to a communication medium, dual redundant cables, of plant control bus, 22 over which the modules 14, 16, 18, and 20 communicate. A more complete description of PCN 10, its functions and operation is found in U.S. Pat. No. 4,607,256.

PCN 10 communicates with distributed digital process control and data acquisition subsystems, however only one such subsystem, universal control network (UCN) 24 is illustrated in FIG. 1. UCN 24, in the preferred embodiment, is a token passing LAN that satisfies IEEE Standard 802.4. IEEE Standard 802.4 is entitled Token Passing Bus Access Method and Physical Layer Specification, Draft H, which was copyrighted by the Institute of Electrical Engineers, Inc., 345 East 47th Street, New York, N.Y. 10017 in 1988. UCN 24 communicates with PCN 10 through network interface module (NIM) 26 which provides communications and data translation facilities between plant control bus 22 and the dual redundant trunk cables 28A and 28B universal control bus 28 of UCN 24. NIM 26 is connected to cables 28A and 28B by drop cables 29A and 29B, respectively. Modules 30, 32, 34, 36, in the preferred embodiment, are process modules, which in addition to controlling devices such as valves, switches, etc., also provide an interface between universal control cables 28 and cables 38, 40, 42, 44 of a process control network which may or may not satisfy IEEE 802.4 and may also be redundant but are not so illustrated. I/O modules 46-1, 48-2, 50-1, 52-2 provide an interface to field devices, such as valves, pressure switches, pressure gauges, thermocouples. I/O module 46-1 converts analogue signals from a source of analog signals, to signals acceptable to PM module 30 and is designated AI for analogue input. I/O module 48-2 converts digital output signals of process controller 32 to analog signals and is designated AO. I/O module 50-1 converts digital signals applied to module 50-1 to signals acceptable to process control module 34 and is designated DI. I/O module 52-2 converts output signals of process module 36 to digital signals for a control device and is designated DO.

Each of the PM's 30, 32, 34, 36 is connected by a pair of drop cables 54A, 54B, 56A, 56B, 58A, 58B, and 60A, 60B to corresponding trunk cables 28A, 28B. NIM 26 is connected to trunk cable 28A, 28B by drop cable 29A, 29B. The terminals, or ends, of trunk cables 28A, 28B are connected to cable terminators 62A, 62B and 64A and 64B, the values of the impedances of which are chosen to match those of trunk cables 28A, 28B to minimize reflection of signals from the ends or terminations of cables 28A or 28B. Such reflections can produce excess noise on trunk cables 28 which interferes with the operation of UCN 24.

Figure 2:
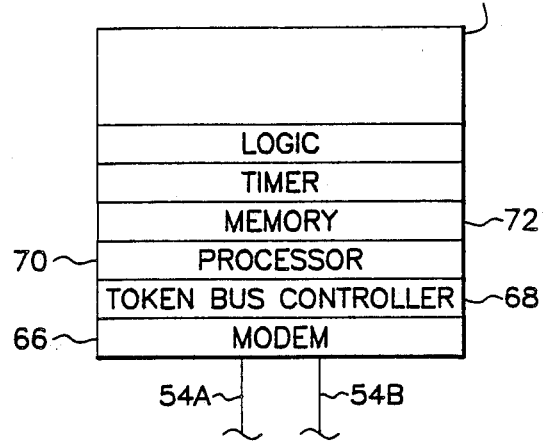
FIG. 2 is a schematic block diagram of a process module (PN) of the UCN of FIG. 1, identifying the subsystems which are common to each module of the UCN.

In FIG. 2 the common elements, or subsystems, of each module of UCN 24 are illustrated such as module 30, for example. Module 30 includes modem 66 which transmits signals over both drop cables 54A, 54B to trunk cables 28A, 28B, and receives signals from only one of the redundant cables 28A, 28B over it's drop cables 54A, or 54B, at any given period of time. Concord Communications, Inc.'s "Carrierband Modular Modem" which is commercially available is used as the modems of the modules of UCN 24 in the preferred embodiment. TBC 68, in the preferred embodiment, is a Motorola MC 68824 "Token Bus Controller" which implements the media access control (MAC) portion of IEEE 802.4 and is also commercially available. Processor 70, in the preferred embodiment, is a standard commercially available microprocessor such as Motorola 68000 and memory 72 is also a commercially available solid state digital data storage device, part of which is a read only memory and the balance a random access memory. It should be noted that each of the modules 26, 30, 32, 34 and 36 include a modem, a token bus controller, a processor, and a memory. For a more complete description of the function and operation of UCN 24 reference is made to "IEEE Standard 802.4", which was copyrighted in 1988 by the IEEE; to Motorola Inc.'s "MC 68824 Token Bus Controller Users Manual" which was copyrighted in 1987, and Concord Communications, Inc.'s "Carrierband Modular Modem Product Description" which was copyrighted in 1986.

When token passing is established on UCN 24, one of the first events to happen is for the module having the smallest, or lowest, address to issue a cable alignment command that is broadcast to all modules on the network. This command causes all modules of the network to receive signals from, or to listen to, the same trunk cable such as cable 28A. It should be noted that each module of the network is assigned a unique address. All frames are transmitted over both cables 28A, 28B, by the modems of each module, but each modem receives or listens to only one cable at any one time, initially the trunk cable specified by the cable alignment command. In each module, the trunk cable to which a module's modem, such as modem 66 of module 30 is listening, is determined by a select cable command issued by the modules processor, such as processor 70 of module 30 to the line switch logic of modem 66. That cable is then designated as that module's selected cable. Modem 66 also detects the presence or absence of signals received from the selected cable, and if no signals are received for a predetermined period of time, 6, or 7 slot times, where a slot time is defined in IEEE Standard 802.4 and is in the preferred embodiment approximately 200 nanoseconds, a TBC such as TBC 68 of module 30 will produce a bus idle timeout interrupt.

The TBC68 does not interrupt its host computer 70 of module 30, for example, when module 30 receives the token, but does produce an interrupt after the TBC has successfully passed the token to its successor module in the logical ring. If the token is not successfully passed, the TBC tries a second time to pass the token to its successor. It waits one slot time; and then, if the proper response is not received by the TBC, the TBC transmits a who follows frame over trunk cables 28A and 28B and waits for three slot times for a response. If no response is received, the TBC will transmit a who follows frame a second time, and if no response is received to the second transmittal of a who follows frame, the TBC generates a no-successor interrupt. The TBC then transmits a solicit-successor frame and waits for a response. If no response is received, the TBC assumes the token is lost and starts transmitting claim-token frames. The TBC interrupts its host if it wins the claim token or if it loses the address sort. The TBC will interrupt its host computer if it receives a claim token frame by producing a claim token interrupt.

A TBC will produce a bus idle time out interrupt after 7 slot times of silence on the selected trunk cable if it does not have any frames to transmit. If the TBC has a frame to transmit, the TBC will start the claim-token frame procedure. A win address sort or lose address sort interrupt is generated by the TBC of each module after the claim token procedure is completed. The TBC also counts the number of detected noise bursts, or frame fragments, and produces a noise/frame fragment counter interrupt, when this number exceeds a predetermined threshold or value.

It should be noted that periods of silence of up to 3 slot times are normal on UCN 24.

The method of this invention is practiced by each module of the network, with each module utilizing interrupts, particularly those produced by its TBC to initiate a sub-algorithm or submethod. Each module, if it detects a cable fault or in response to a cable fault detected by another module of the network, switches to the redundant cable, the second cable which then is the selected cable from which each module will receive signals or to which it listens.

A cable fault is detected by silence, by signals not being received by a module within a given period of time, from its selected cable or by excessive noise or garbled signals being received by a module from its selected cable. Silence is usually the result of a drop cable, such as cable 54A of module 30, for example, being severed when cable 28A is the selected cable for module 30. Silence can also be caused by a break in trunk cable 28A between modules 34 and 36 for example, since when that occurs, module 36 will be unable to receive signals from any other module over cable 28A.

A break in the selected trunk cable also produces noise since both ends of each segment of the selected trunk cable on both sides of the break are not properly terminated by matching impedances. Reflections of transmitted signals from the unterminated ends of the severed selected cable can garble signals being transmitted over the cable as well as cause the selected cable to be too noisy for proper operation of the network. Damage or removal of one or both terminators of a cable, such as terminators 62A and 64A of cable 28A, would result in the cable becoming unacceptably noisy.

Because of the number of independent variables affecting cable performance of UCN 24, such as the proximity of the modules to the cause of the cable fault, such as a cable break, the number and states of the modules of the network at the time a fault occurs, the behavior of the network at the time a cable fault occurs is essentially non-deterministic. Thus, the method, or algorithm, of this invention is reactive; that is, each of the sub-methods, sub-algorithms, or subroutines is initiated or executed in response to a particular condition or set of conditions, as determined by each module primarily by interrupts produced by the TBC, for example. Stated another way, the sub-algorithms executed by each module are determined by the health, or state, of the selected trunk cable from which the module is receiving signals at any given time as determined by that module. Thus the method, or algorithm of this invention is a collection of sub-algorithms, each of which is designed to detect a cable fault, and to respond to the detected fault, essentially by switching the modem to receive signals from the redundant cable. These sub-algorithms cause the module to select a properly functioning or healthy, cable for communication with the other modules of the network if one is available. Thus upon detecting a fault, noise or silence, in the selected cable, the algorithms of this invention cause the fault to be reported and the module to select, or listen, to the redundant cable. The execution of the method by each module results in all the modules of the network switching to the healthy cable with the module first identifying the fault transmitting a cable switch command addressed to all the modules of the network, or to multicast such a command to the network.

Figure 3:
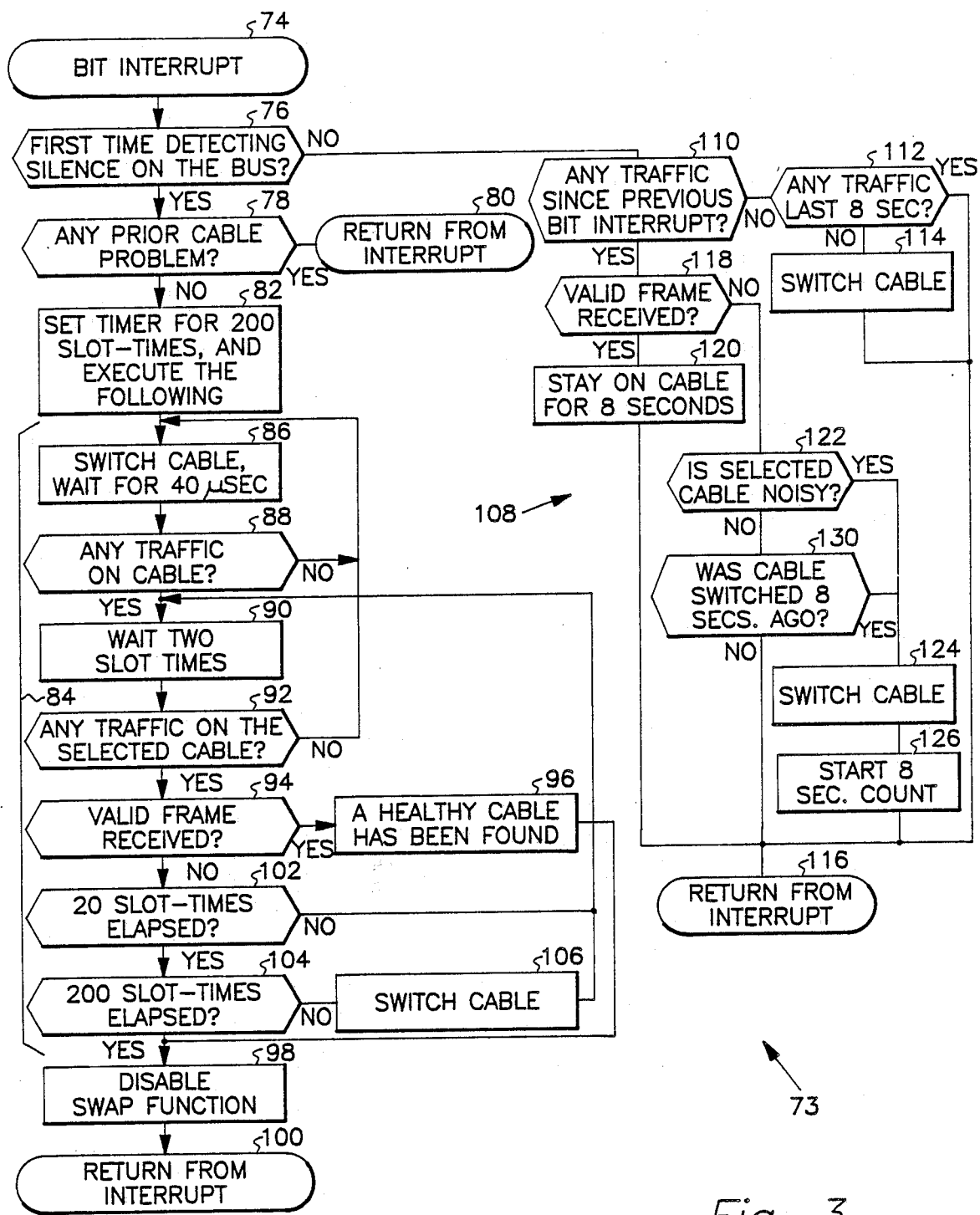
FIG. 3 is a flow chart of one subroutine of the invention.

TBC 68 of Module 30, for example, will produce a bus idle time out interrupt, which is applied to processor 70 if no signals are received or no traffic is heard for 7 slot times, or 6 slot times for the module having the lowest address. The bus idle timeout interrupt service 73, illustrated in FIG. 3, is invoked, or begins execution by processor 70 when TBC 68 generates a bus idle timeout interrupt for the first time after module 30 has become a token passer, or is in the logical ring of network 24 and is passing the token to its successor. The bus idle timeout interrupt service provides each module with the capability of detecting an absence of traffic due to a cut in the selected drop or trunk cable. Subroutine 73 will switch to the redundant cable if the redundant cable is healthy, or hunt for a healthy cable if the redundant cable appears to be faulty, that is silent or noisy for 200 slot times which turns out to be in the preferred embodiment approximately 40 milliseconds. The 200 slot times is based on the claim token procedure which the TBC initiates when the token is lost on the network. The claim token phase consists of 25 claim token frames with a data field length of from 0–6 slot times. The TBC delays one slot time after each claim token frame before listening for traffic. Therefore, the worst case timing for the claim token phase is approximately 175 slot times. However, if the module address is 48 bits long and all ones, no traffic can be detected by the traffic detector logic of the module for a longer period of time up to 200 slot times. The reason is that the traffic detector logic does not receive, or listen while its module is transmitting. Since the module is the highest address node, no traffic can be detected during one slot time of delay between the claim token frames, therefore to find a healthy cable the subroutine must look for traffic after the module has won the token and starts searching for a successor which to pass the token. As a result, the subroutine tries to find traffic in a healthy cable for the next 25 slot times after the claim token phase. The TBC of a module will generate a bus idle time out interrupt if no traffic is heard for 7 slot times, or 6, as stated above, and it will continue to generate this interrupt after every 7 or 6 slot times has elapsed as long as no traffic is being detected. A process module utilizes the bus idle time out interrupt to find the healthy cable when it joins the network, and will switch to the redundant cable if its selected cable becomes silent.

Referring to FIG. 3, in response to the first bus idle timeout (BIT) interrupt produced by a TBC, the BIT interrupt service subroutine 73 is initiated, block 74. Subroutine 73 checks to see if this is the first time a BIT interrupt has been produced since the token has been passed, block 76. If it is the first time, then subroutine 73 checks to see if there is a problem with the redundant cable, i.e., has it previously been detected as being faulty, block 78. If the redundant cable has previously been determined to be faulty, then subroutine 73 terminates, and returns from the interrupt block 80. If the redundant cable is presumably not previously identified as being faulty, then a watchdog timer is set for 200 slot times, block 82, and sub-algorithm 84 is executed. Sub-routine 84 will switch the cable to the redundant cable and wait for 40 microseconds, block 86. If any traffic is detected on the cable to which the module has just switched, the subroutine will wait for two slot times, block 90, and check to see if there is any traffic on the selected cable, block 92. If a valid frame has been received, block 94, a healthy cable has been found, block 96, the periodic swap function is disabled, block 98 and subroutine 73 terminate, and the processor returns from the interrupt, block 100.

If a valid frame has not been received as determined by block 94, then a check is made to determine if 20 slot times have elapsed, block 102. If the answer to block 102 is yes, then a check is made to determine if 200 slot times have elapsed, since subroutine 73 was initiated, block 104. If the answer is yes, the swap function of the module is disabled, block 98, and the subroutine terminated by a return from the interrupt block 100.

If the answer to block 102 is no, then the sub-algorithm is reentered between blocks 88 and 90, and if the answer to the test of block 104 is no, the selected cable is switched, block 106, and sub-algorithm is reentered between blocks 88 and 90.

If no healthy cable is determined during the 200 slot time period during which sub-algorithm 84 is in execution, the TBC will continue to produce BIT interrupts. When the first BIT interrupt is produced after 200 slot time has elapsed, since the first BIT interrupt the answer to block 76 is no, which transfers to sub-algorithm 108. Sub-algorithm 108 checks to determine if there has been any traffic since the previous BIT interrupt, block 110. If the answer to block 110 is no, a check is made to determine if there been any traffic in the last 8 seconds, block 112, if the answer is no, the cables are switched, and subroutine 73 returns from the interrupt block 116. If the answer to the test of block 112 is yes, subroutine 73 returns from the interrupt, block 116. If there has been traffic detected in executing block 110 and the answer to the question posed by block 110 is yes, a check is made to determine if a valid frame has been received, block 118. If the answer is yes, then the module will stay on the same cable for 8 seconds, block 120, and return from the interrupt block 116. If the answer is no the test of block 118, then the sub-algorithm checks to determine if the selected cable is noisy, block 122. If the answer is yes, the subroutine causes the cable to be switched, block 124, restarts an 8 second counter, block 126, and returns from the interrupt, block 116. If the answer to the test of block 122 is no, namely, that the selected cable is not noisy, then a check is made to determine if the selected cable was switched within the past 8 seconds, block 130. If the answer is yes, the cable is switched again, block 124, the 8-second counter is restarted, block 126, and the subroutine is terminated, block 116. If the answer is no, then the subroutine is terminated, or returns from the interrupt, block 116.

Figure 4:
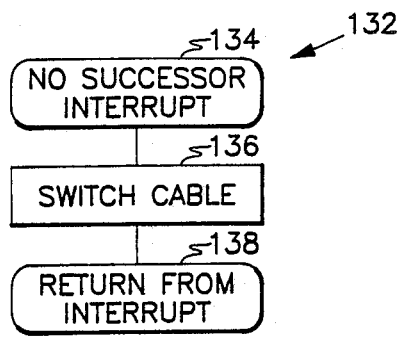
FIG. 4 is a flow chart of a second subroutine of the invention.

When a module detects a fault on its selected cable and switches to its redundant cable, it is necessary to cause the remaining modules to switch to the healthy cable so that the network can be restored to full operations. If the TBC produces a no successor interrupt indicating that its successor is not receiving the token addressed to it, then the subroutine servicing this interrupt will cause the modem to switch to the redundant cable, particularly if the cable is cut when the node or module has the token. The no successor interrupt is generated by the TBC when it cannot pass the token to any other module on the network so that the TBC thinks it is alone on the network. The no successor interrupt is produced when the node has the token and the selected cable or trunk is cut right before the token is passed to the next module. In this situation, the TBC tries to pass the token to its successor and then to any other module without any success. Finally, after failing to pass the token, the no successor interrupt is generated which indicates that the module believes it is the only module in the network. Alternatively, this interrupt is produced when the module is connected to the network and no other module is in the token passing mode. Sub-routine 132 as illustrated in FIG. 4 is initiated by a module's TBC producing a no successor interrupt, block 134. As a result, the module's selected cable is switched to the redundant cable, block 136, and the subroutine 132 terminates, or returns from the interrupt, block 138.

The function of the subroutine initiated in response to the TBC of a module producing a successor change interrupt is to switch the cable. As a result of the switch, the module can now hear its successor and the two modules can communicate providing the successor module has also switched to the redundant cable after its TBC has produced the first BIT interrupt.

The TBC will produce a successor change interrupt when the module has a new successor. The typical reason for producing this interrupt is that the successor module's drop cable has been cut so that the successor module can no longer be communicated with over the selected cable. The module with the token will then by-pass its present successor and seek another at which time the TBC of the module generates a successor change interrupt for its host processor. Alternatively, if the successor module leaves the token ring by going off the network or by being powered down, the TBC will react in the same way as if the drop cable to its successor module were cut. When a successor change interrupt is produced, it is serviced by, or initiates, an interrupt service which, subroutine 140 is initiated in response to a successor change interrupt, block 142, which disables the periodic swap function, block 144, enables the TBC's no response interrupt, block 146, and checks the number of no response interrupts, block 148, until 3 have been produced. When three no response interrupts are produced consecutively, the address of any new successor is checked, block 150. If the answer to block 150 is yes, the cables are switched on a token pass interrupt, block 152. If the answer is no, block 152 is bypassed and the no response interrupt is disabled, block 154, which terminates the subroutine or it returns from the interrupt, block 156.

If a successors drop cable is faulty all modules will switch to the redundant cable within a short period of time. If the successor module is no longer on the network, its predecessor module will switch back to the original cable after 16 seconds via a command from its processor. The cables are not switched right away after a successor change interrupt. The cables are switched when it is believed the network is stable and successor module changes are not occurring caused by marginal connections. Other routines are responsible for switching to the redundant cable in the case of a loose connection.

After a successor change interrupt, a token bus controller is enabled to produce no response interrupts. No response interrupts are generated by the TBC if no response is received from any other module in the network, when the TBC opens a window to permit other modules to join the token ring following a successor change interrupt. The cables are switched after three consecutive no response interrupts from the TBC. This subroutine prevents switching back and forth caused by a successor change interrupt due to a marginal circuit connection. However, if marginal circuit connections cause excessive noise and/or frame fragments on the network, then the cable is switched by the node detecting the noise by producing a noise/frame fragment interrupt.

The TBC of a module will produce a claim token interrupt when for any reason the token passing stops in the network. As a result, a module receiving the claim token will switch to the redundant cable which enables the modules to reestablish token passing and communications between modules if the problem is with the cable to which they were listening. In general when the token is lost after 7 slot times, or 6 slot times for the lowest address module, the modules start the claim token procedure according to IEEE 802.4 to regain the token. However, only one module, or node, the one with the lowest address becomes the token holder at the end of the claim token phase. The node which wins the token will generate a win address sort interrupt for its host and invite other nodes into the token ring. Other modules participating in the claim token procedure will generate a lost address sort interrupt for their host processor and wait to get invited to the network. Modules which have not participated in the claim token procedure but have received a claim token frame will generate a claim token interrupt for the host and wait to enter the token ring. When these interrupts are produced, a module will switch cables when a claim token win address sort or lost address sort interrupt is received. It should be noted that in a steady state network, a sudden collapse of the network is usually due to one or more cable faults in the selected cable.

The TBC of a module will produce a noise/frame fragment counter interrupt if the number of times the noise threshold of signals received by the modem of the module is exceeded or the number of frame fragments received within a predetermined period, 300 millisecond in the preferred embodiment, and the number of such incidents equals or exceeds 25.

Figure 6:
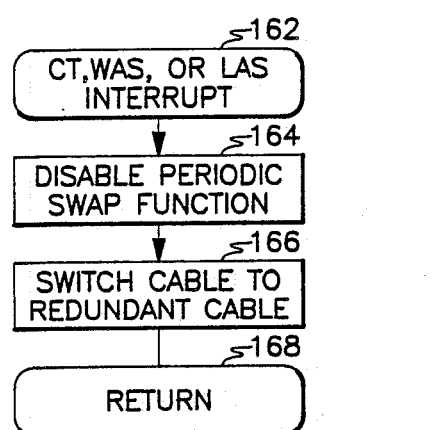
FIG. 6 is a flow chart of a fourth subroutine of the invention.

Interrupt service subroutine 160, which is illustrated in FIG. 6, is initiated in response to a claim token interrupt, a win address sort (WAS) interrupt, a (LAS) interrupt, produced by a module's TBC, block 162, initiates subroutine 160. Subroutine 160 disables the periodic swap function, block 164, switches the cable to the redundant cable, block 166, and returns from the interrupt or ends subroutine 160, block 168.

Figure 7:
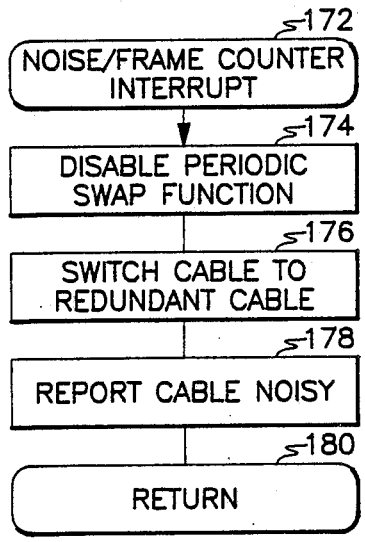
FIG. 7 is a flow chart of a fifth subroutine of the invention.

Interrupt service subroutine 170 which is illustrated in FIG. 7 is initiated in response to the noise/frame fragment counter of the TBC exceeding a predetermined number in a predetermined time period which causes the TBC to produce a noise frame counter interrupt. This interrupt initiates subroutine 170, block 172. Subroutine 170 disables the module's periodic swap function, block 174, and switches cables, block 176. Subroutine 170 then notifies the operating system of its processor that its previously-selected cable is noisy, block 178, and terminates or returns from the interrupt, block 180.

While the execution of the subroutines of this invention initiated by the TBCs of the modules of UCN 24 solve most of the problems caused by faults in the communication cables 28A and 28B of UCN 24, there is a further need for a module to be able to detect the presence of low level noise on its selected cable, noise which is not of sufficient intensity or frequency to cause a module's TBC to produce a noise/frame fragment counter interrupt, but which noise can cause intermittent problems for a module receiving such signals.

It is not requirement of UCN 24 that all modules be regularly transmitting signals; i.e., some may merely be listening, or receiving signals from other modules of UCN 24 or from modules of PCN 10. A module in a listening mode of operation does not check the quality of the signals being received, only that signals are being received from its selected cable. Thus, there is a need for a module in the listening only mode to verify that the signals received over its selected cable are valid, constitute a valid frame from which it is concluded that the modules selected cable is not noisy.

It is also desirable that a module whose redundant cable has been identified as being silent be checked periodically to determine if it remains silent, and if it is no longer silent, then the redundant cable is available to be swapped with the presently selected cable in the future.

Figure 8:
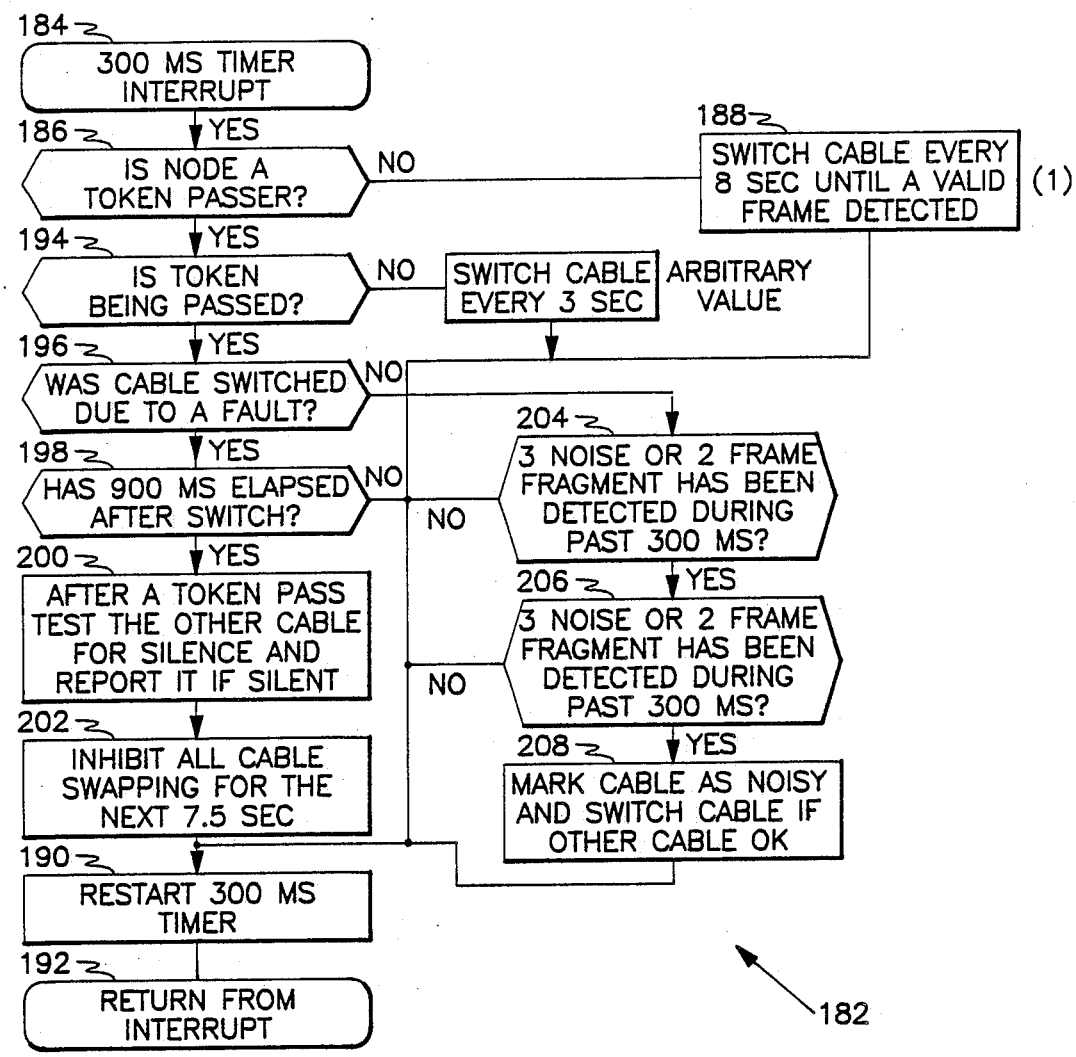
FIG. 8 is a flow chart of a sixth subroutine of the invention.

Subroutine 182 illustrated in FIG. 8 has as its purpose to check for low level noise on a module's selected cable, to check if the signals received by a module in the listening mode are valid, and to determine if a module's redundant cable which has been identified as being silent is currently silent or continues to be silent.

Subroutine 182 is initiated by an interrupt produced by a conventional timer called, in the preferred embodiment, a silence timer, which is incorporated in each module of UCN 24. The silence timer produces a periodic interrupt, once every 300 msec. in the preferred embodiment. The silence timer is restarted every 7 msec after the communication cables are switched. This enables the processor of each module to monitor and clear its TBC's faulty transmitter counter if the presently selected trunk cable is not healthy. The timer is restarted after each successful token pass on its selected cable. An additional function of the silence timer is to make certain that the faulty transmitter counter of a module's TBC does not reach 7 after a cable fault to prevent having to reinitialize the TBC. The faulty transmitter counter of the TBC is incremented each time the TBC concludes that its transmitter is faulty. This can happen if the transmitter of the modem is faulty or during a cable fault before all modules switch to the redundant cable. This situation generally occurs when a module is receiving signals from a healthy cable while its predecessor is receiving signals from a faulty cable. As a result a module can hear its predecessor without being heard by it.

Subroutine 182 after token passing is established on UCN 24 also tests the perceived faulty cable for silence for 900 msec after a cable switch due to a cable fault by restarting the silence timer every 300 msec. The 900 msec period starts after token passing has been established. Testing the redundant cable after 900 msec allows sufficient time for all the modules on the network to switch to the healthy cable, and the network to stabilize, since testing a faulty cable otherwise could disturb the network. Subroutine 182 prevents further cable switching for approximately 7.5 seconds after a cable switch due to a cable fault. This 7.5 second period starts after token passing has been established on the newly selected cable.

This subroutine also initiates a cable switch when a module detects the sustained presence, or occurrence of noise or frame fragments due to loose or marginal connections, for example, which are insufficient to cause the TBC to produce a noise/frame interrupt. Such noise will degrade the performance of the network without resulting in a complete collapse. A cable switch is performed if for 3 consecutive periods of 300 msec noise and frame fragments above a set threshold are detected in compliance with IEEE Standard 802.4, noise is defined as the reception of signals which the TBC of a module does not recognize as including a start delimiter, and a frame fragment is defined as the reception of signals which the TBC of a module recognizes as including a start delimiter but amongst which signals the TBC does not detect an end delimiter. In the preferred embodiment, the threshold is set at four noise incidents or three frame fragments in each of three consecutive 300 msec. periods. This prevents a cable switch caused by a motor startup or lightning, for example, while resulting in the cables being switched for sustained noise caused by faulty hardware. If the module with the token cannot pass the token to its successor because of such noise, the cable is switched every 3 seconds until token passing has been re-established.

A module in the listening mode of operation will switch cables every 8 seconds if no valid frame is received within that period. This subroutine causes a module, or node, in the listening only mode to seek a healthy cable if its selected cable is noisy.

FIG. 8 is the flow chart of subroutine 182. Subroutine 182 is initiated by the 300 millisecond timer interrupt, block 184. The subroutine checks to see if the module has the token, block 186. If it does not, then the subroutine will switch cables every 8 seconds until a valid frame is detected, block 188. When a valid frame is received, subroutine 182 restarts the 300 m.sec. timer, block 190, and returns from the interrupt, block 192.

If the module has the token, a check is made to determine if the token is being passed, block 194. If the token is being passed, a check is made to determine if the cable was switched due to a fault, block 196. If the answer is yes, then a check is made to determine if 900 m.sec. has elapsed since the switch of the trunk cables, block 198. If the answer is yes, then after the module has passed the token to a successor, a test is made to determine if the redundant cable is silent, block 200. If it is, this fact is reported, block 200. If the redundant cable is silent, switching of trunk cables by the module is inhibited for 7.5 seconds, block 202 and block 190 and 192 are then executed. If the answer to block 196 is no, subroutine 182 will check to see if the selected cable is noisy, block 204. If the answer is yes, a second check of the selected cable is made to determine if the selected cable is still noisy, block 206. If it is, the cable is identified as being noisy, and the trunk cable is switched, but only if the redundant cable has not been reported as being faulty, block 208; then blocks 190 and 192 are executed. If the redundant cable is determined not be noisy while executing block 204, or block 206, then blocks 190 and 192 are executed.

From the foregoing it is believed obvious that method of this invention provides a solution to the problem in a universal token passing local area network satisfying the IEEE Standard 802.4, but provided with redundant trunk cables which can detect a faulty cable and provide a method for identifying or switching between the trunk cables until a properly functioning trunk cable is found.

Appendix A

Related Applications

The present application is related to the following:
(a) patent application Ser. No. 07/299,857, entitled "APPARATUS FOR TRACKING PREDETERMINED DATA FOR UPDATING A SECONDARY DATA BASE," by P. Gerhart, filed on Jan. 23, 1989;
(b) patent application Ser. No. 07/299,859, entitled "METHOD FOR CONTROL DATA BASE UPDATING OF A REDUNDANT PROCESSOR IN A PROCESS CONTROL SYSTEM," by P. McLaughlin et al, filed on Jan. 23, 1989;
(c) patent application, Ser. No. 07/259,064, now U.S. Pat. No. 4,937,575 entitled "A PRECISION A/D CONVERTER UTILIZING A MINIMUM OF INTERFACE INTERCONNECTIONS," by K. Kummer, filed on Oct. 18, 1988;
(d) patent application Ser. No. 07/153,753, now U.S. Pat. No. 4,841,286 entitled "APPARATUS AND METHOD FOR DETECTION OF AN OPEN THERMOCOUPLE IN A PROCESS CONTROL NETWORK," by K. Kummer, filed on Feb. 8, 1988;
(e) patent application Ser. No. 07/147,962, entitled "APPARATUS AND METHOD FOR COMPENSATION OF CIRCUIT GAIN ERRORS IN A PROCESS CONTROL NETWORK," by K. Kummer, filed on Jan. 25, 1988;
(f) patent application Ser. No. 07/121,561, now U.S. Pat. No. 4,872,186 entitled "APPARATUS AND METHOD FOR IDENTIFICATION OF MESSAGE INITIATION IN A PROCESS CONTROL NETWORK," by P. Gerhart et al, filed on Nov. 17, 1987;
(g) patent application Ser. No. 07/121,548, now U.S. Pat. No. 4,860,280 entitled "APPARATUS AND METHOD FOR A SECURE AND DIAGNOSABLE ANTI-JABBER COMMUNICATION CIRCUIT," by P. Gerhart, filed on Nov. 17, 1987;
(h) U.S. Pat. No. 4,607,256, issued on Aug. 19, 1986, (reissue applied for, reissue Ser. No. 07/186,230, filed on Apr. 26, 1986, now abandoned); and
(i) U.S. Pat. No. 4,296,464, issued on Oct. 20, 1981; all of above assigned to Honeywell Inc., the assignee of the present application.

BACKGROUND OF THE INVENTION

This invention relates to an apparatus for interfacing a plurality of signals to a processor, and more particularly, to an interface apparatus for interfacing a selectable plurality of different types of signals to a process control system.

In present day process control systems, interface devices are utilized to couple predetermined types of signals to the process control system, the predetermined types of signals being high-level analog, low-level analog, digital, . . . . Because of a rigid structure of these present day interface devices, only predetermined types of signals are permitted to be coupled to these present day interface devices. Also, the rigid structure provides only a predetermined number of control loops and secondly, only a predetermined number of input/output (I/O) for the control loops. Because some control tasks are more control processing intensive than others, and some tasks are more I/O intensive than others, it is desirable to interface selective tasks to the process control system via the interface device which will insure effective and efficient completion of these tasks, i.e. control processing and I/O. However, the configuration provided by the structure of these present day interface devices is essentially fixed, i.e., restricting what the user can do to efficiently tailor the configuration to specific user requirements, thereby limiting the number and types of tasks which can be coupled to the interface device.

The interface apparatus of the present invention permits a flexible quantity of different types of I/O signals to be interfaced (to the process control system) via the interface apparatus due to the architecture of the interface apparatus which essentially separates the processing of control from the I/O of control, thereby permitting the user to configure the system to meet a defined control strategy, without the limitations imposed by previous systems Further, the processing of control can be eliminated altogether in the interface apparatus of the present invention. In this case the processing of control is performed by a controller external to the interface apparatus, thus permitting the interface apparatus to function as a data aquisition unit, thereby adding to the configuration flexibility.

SUMMARY OF THE INVENTION

Therefore, there is provided by the present invention, an apparatus for interfaces a plurality of signals to a processor. In a process control system, there is a plant control network for performing the overall supervision of a process being controlled. The plant control network has at least one external bus for operatively connecting a corresponding interface apparatus to the plant control network. Further, each interface apparatus interfaces with at least one predetermined field device, each field device being a type having a corresponding predetermined signal type. The interface apparatus comprises a controller, operatively connected to the bus for controlling the input/output (I/O) of the interface apparatus. At least one I/O module, operatively connected to the controller preprocesses information signals to and from the predetermined field device connected to the I/O module. The preprocessing includes translating between the signal type of the field device and signals compatible with the controller.

Accordingly, it is an object of the present invention to provide an apparatus for interfacing a plurality of signals to a processor apparatus.

It is another object of the present invention to provide an apparatus for interfacing a plurality of different types of signals to a process apparatus.

It is still another object of the present invention to provide an apparatus for interfacing a plurality of different types of signals to a process control system.

It is a further object of the present invention to provide an apparatus for interfacing selectable quantities of different types of signals to a processor apparatus.

It is still a further object of the present invention to provide an apparatus for interfacing selectable quantities of different predefined types of signals to a processor apparatus.

It is yet another object of the present invention to provide an apparatus for interfacing selectable quantities of different predefined types of signals to a processor apparatus, wherein the selection of the signals is made by a user.

These and other objects of the present invention will become more apparent when taken in conjunction with the following description and attached drawings, wherein like characters indicate like parts, and which drawings form a part of the present application.

BRIEF DESCRIPTION OF THE DRAWINGS

Figure 5:
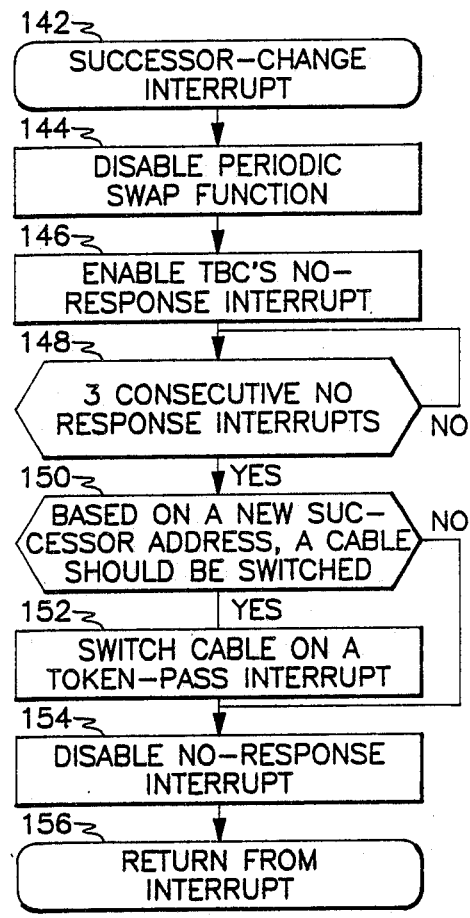
FIG. 5 is a flow chart of a third subroutine of the invention.

FIG. 1 shows a block diagram of a process control system in which an interface apparatus of the present invention may be utilized;

FIG. 2 shows a block diagram of a process controller, the preferred embodiment of the interface apparatus of the present invention;

FIG. 3 shows a block diagram of a controller of the process controller of the preferred embodiment of the present invention;

FIG. 4 shows a block diagram of the I/O module of the preferred embodiment of the present invention; and FIG. 5 shows a block diagram of an alternative embodiment of a process control system incorporating the interface apparatus of the present invention.

DETAILED DESCRIPTION

Before describing the interface apparatus of the present invention, it will be helpful in understanding a system environment in which the interface apparatus can be utilized. Referring to FIG. 1, there is shown a block diagram of a process control system 10 in which the interface apparatus of the present invention can be found. The process control system 10 includes a plant control network 11, connected thereto is a data highway 12, which permits a process controller 20' to be connected thereto. In the present day process control system 10, additional process controllers 20' can be operatively connected to the plant control network 11 via a corresponding highway gateway 601 and a corresponding data highway 12. A process controller 20, the interface apparatus of the present invention, is operatively connected to the plant control network 11 via a universal control network (UCN) 14 to a network interface module (NIM) 602. In the preferred embodiment of the process control system 10, additional process controllers 20 can be operatively connected to the plant control network 11 via a corresponding UCN 14 and a corresponding NIM 602. The process controllers 20, 20', interface the analog input and output signals, and digital input and output signals (A/I, A/0, D/I, and D/0, respectively) to the process control system 10 from the variety of field devices (not shown) which include valves, pressure switches, pressure gauges, thermocouples, . . . .

The plant control network 11 provides the overall supervision of the controlled process, in conjunction with the plant operator, and obtains all the information needed to perform the supervisory function, and includes an interface with the operator. The plant control network 11 includes a plurality of physical modules, which include a universal operator station (US) 122, an application module (AM) 124, a history module (HM) 126, a computer module (CM) 128, and duplicates of these modules (and additional types of modules, not shown) as necessary to perform the required control/supervisory function of the process being controlled Each of these physical modules is operatively connected to a local control network (LCN) 120 which permits each of these modules to communicate with each other as necessary. The NIM 602 and HG 601 provide an interface between the LCN 120 and the UCN 14, and the LCN 120 and the data highway 12, respectively. A more complete description of the plant control network 11, and the physical modules can be had by reference to U.S. Pat. No. 4,607,256, referred to above as related application (h). A more complete description of the process controller 20' can be had by reference to U.S. Pat. No. 4,296,464, referred to above as related application (i).

Referring to FIG. 2 there is shown a block diagram or the process controller 20, i.e., the interface apparatus of the present invention. The process controller 20 of the preferred embodiment of the present invention includes a controller A 30 and a controller B 40, which effectively operate as a primary and secondary controller. Controller A 30 and controller B 40 are connected to the UCN 14, the UCN 14 in the preferred embodiment of the present invention comprising for communication redundancy purposes, a UCN(A) 14A and a UCN(B) 14B. Input output (I/O) modules 21 interface to field devices, field devices being various valves, pressure switches, pressure gauges, thermocouples, . . . which can be analog inputs (A/I), analog outputs (A/0), digital inputs (D/I), and digital outputs (D/0). The controller A 30 interfaces to each I/O module 21 via a bus A 22, and controller B 40 interfaces to each I/O module 21 via a bus B 23. In addition, once again for communication redundancy purposes, controller A 30 is also connected to bus B and controller B 40 is connected to bus A 22.

Controller A and controller B, 30, 40, can communicate with each other via three mediums, the UCN 14, a link 13 between the controllers, and the buses A, B, 22, 23, bus A and bus B in the preferred embodiment of the present invention being serial I/O links. One controller (controller A 30 or controller B 40) operates as a primary controller and the other controller operates as a secondary controller (in more of a reserve mode than a back-up, in that if a failure of controller A 30 should occur, controller B is ready to take over the control function with essentially no start-up or initialization time). On a predetermined time basis, point processing is performed by the controller designed as the primary controller and communicates with the I/O modules 21. In addition, the controller acting as the primary controller communicates with the plant control network 11 reporting status, history, and accepting inputs from the plant control network such as commands from the operator via the universal station 122. In addition, a data base maintained by the primary controller is communicated to the secondary controller via link 13. Updating of the data base in the secondary controller is further described in the aforementioned related applications (a) and (b). In the preferred embodiment, as mentioned above one controller operates as a secondary controller; however, it will be understood by those skilled in the art that a secondary controller is not necessary for the process controller 20. In the preferred embodiment of the present invention, the secondary controller is optional and operates in a mode intended by the invention. It will further be understood by those skilled in the art that various configurations can exist for interfacing the controllers A, B 30, 40 to the UCN 14A 14B. Controller A 30 can be interfaced to UCN 14A and controller B 40 can be interfaced to UCN 14B; however, in this case a bus (UCN) event that causes UCN A 14A to fail can cause a switch-over to the backup controller, i.e., controller B 40. But in the preferred embodiment, controller A 30 is connected to both UCN 14A and 14B. like, controller B 40 is connected to both 14A and 14B. In this configuration, a communication event does not force the system to a processor failover situation.

Referring to FIG. 3, there is shown a block diagram of the controller 30, 40. A modem 50 is connected to the UCN 14, the modem having two inputs, one connected to UCN 14A and the other connected UCN 14B. In preferred embodiment of the present invention, the modem is a Concord Data Systems 5 mega-bit carrier band modem having two ports which allows interfacing with both UCN 14A and UCN 14B. The modem interfaces with a communication unit (COMM) 60 which in turn interfaces with a global memory 70, an I/O interface unit 80, and a control unit 90 via global bus 72. The communication unit 60 includes a communication control unit, in the preferred embodiment a token bus controller (TBC) 61, Motorola type 68824, which is connected to a local bus 62. Connected to the local bus 62 is a processor A 63 (which essentially performs the communication function) and a local memory A 64. The processor A 63 via the TBC 61. communicates with the plant control network 11 via modem 50. The local memory A 64 stores information, including personality image which is downloaded from the plant control network 11, for use by processor A 63 and TBC 61. The global memory 70 stores information which is common to both processors A63 and B 91. It also stores all the data received from bus A 22 and bus B 23. The global memory 70 also serves as an interprocessor communication vehicle between processors A 63 and B 91. Control unit 90 includes a processor B 91 and a local memory B 92. Processor B 91 performs the control function (i.e., control processing) relating to the field devices This essentially includes performing the point processing, and updating the local memory B 92 and global memory 70. Also coupled to the local bus 93 of control unit 90 is a track unit 94 which is utilized to implement the data base transfer via link 13 to the other controller 30, 40 of the process controller 20. A more detailed description of the track unit 94 can be had by making reference to the related patent applications identified above as related applications (a) and (b). The I/O interface unit 80 includes a receiver-transmitter device, in the preferred embodiment of the present invention this device being a UART (Universal Asynchronous Receiver/Transmitter) 81. In the preferred embodiment of the present invention the UART utilized is a circuit within the Intel 80C31 microcontroller. The UART 81 is coupled through drivers 82, 83 to bus A 22 and bus B 23 respectively. (As mentioned previously, control unit 90 can be eliminated, the control processing being performed by another processor within the plant control network 11, such as AM124. In this configuration, the interface apparatus of the present invention functions as a data acquisition unit).

Processor B 91 receives data from the various field devices through global memory 70, performs the necessary point processing and control function, and then updates the local memory B 92 and global memory 70, as required. The communication unit 60, in response to commands from the control unit 90 via global memory 70, inputs and outputs data between the I/O modules 21 (via the I/O interface unit 80) and the global memory 70, thereby relieving the control unit 90 from the burden of I/O module management. In this manner the control processing is performed by the control unit 90 within the process controller 20 for the predefined attached field devices, and the communication (i.e., the I/O control) is handled by the communication unit 60 through the UART 81.

Referring to FIG. 4 there is shown a block diagram of the I/O module of the preferred embodiment of the present invention. A transceiver (anti-jabber circuit) 201 interfaces with bus A 22 and bus B 23. The transceiver of the preferred embodiment of the present invention is of the type described in the aforementioned related application identified as related application (g) and (f). The transceiver 201 interfaces with a microcontroller (u-controller) 202. In the preferred embodiment of the present invention the microcontroller 202 is of the type, Intel 80C31. The microcontroller is coupled to a local bus 203, and includes an EPROM 204 and a RAM 205 also attached to the local bus 203. The RAM 205 contains the information which forms the database for the I/O module 21. The EPROM 204 contains the program information utilized by the microcontroller 202. (It will be recognized by those skilled the art that the EPROM and RAM comprise a memory unit and any type memory unit which can interface with the microcontroller 202 may be utilized.) Also attached to local bus 203 is an input buffer which receives the I/O link address information from the I/O link (bus A, bus B, 22, 23). Connected to the input buffer (BUFFER IN) 206 is a hardware revision code unit 207 which identifies the hardware and revision of the I/O module 21 which can be read by the microcontroller 202 in order to verify the revision of the hardware. The output buffer (BUFFER OUT) 208 is also connected to the local bus 203. The application specific circuits 209 is also connected to the local bus 203 and interfaces with the input and output buffers 206, 208, and the microcontroller 202 via the local bus 203. The application specific circuits vary from I/O module to I/O module depending on the field device to which the I/O module is to be coupled. If the field device is of a type which requires a digital input, then the application specific circuit 209 will include the logic in order to place the digital input into a predefined format which will interface with the remainder of the I/O module. Likewise, if the field device is such that requires an analog input, then the application specific circuit contains a logic which converts the analog input signal (via an A/D converter) into a format again consistent with predefined formats In this manner, the I/O modules are referred to as a specific I/O module type. The microcontroller 202 performs the I/O processing (or preprocessing) for the application specific circuits 209. The preprocessing will vary from each I/O module 21 depending on the type (i.e., A/I, A/0, ... ) the preprocessing essentially consisting of translating the signals from the application specific circuits to a format compatible with the controller 30, 40 (and more specifically with control unit 90), and putting the signals from controller 30, 40 in a format compatible with the I/O module 21. Some of the preprocessing performed includes zero drift, linearization (linearizing thermocouples), hardware correction compensation (gain compensation and zero compensation), reference junction compensation, calibration correction conversions, checking for alarms (limits) ... and generating a signal in a predetermined format having predetermined scale (i.e., engineering units, normalized units, percent of scale, ... ). In the preferred embodiment of the present invention seven types of applications specific circuits are provided for, these include a high level analog input, low level analog input, analog output, digital input, digital output, smart transmitter interface, and pulse input counter. For example, a detailed description of the low level analog input application specific circuit can be had by reference to the related application identified above as related application (c), and also to related applications (d) and (e).

Referring to FIG. 5, there is shown a block diagram of an alternative embodiment of a process control system incorporating the interface apparatus of the present invention. The network interface module (NIM) 602 is coupled to the universal control network (UCN) 14. Also coupled to the UCN 14 is a plurality of process controllers (PC) 20A, 20B, ... 20N, the interface apparatus of the present invention. The process controllers 20, 20B, ... 20N, can initiate communication to the plant control network 11, or can communicate with any other process controller coupled to UCN 14, unlike the previous process controllers 20, These previous process controllers 20, were slaved to the highway gateway (HG) 601 and could only communicate in response to a message from HG 601. Thus, the process controllers 20A, 20B, ... 20N, of the present invention provide for "peer-to-peer" communication.

Referring back to FIG. 2 it can be seen that the process controller 20 has a degree of flexibility not heretofore available. If the field devices for the particular process being controlled are all of an analog input type, the I/O modules 21A, 21B, 21C, 21D, can all be the same I/O module type; however, in the preferred embodiment of the present invention, the application specific circuit for the module 21 is changed to properly interface with the signal provided by the field device. In this manner, the process controller 20 is configurable to the field device configuration simply by inserting the correct module, i.e., the I/O module type being compatible with the field device. Thus, it can be readily seen that the architecture of the interface apparatus of the present invention allows the user the flexibility of configuring the system to the process being controlled simply by inserting the required I/O modules into slots allocated to receive the I/O modules without any electrical, mechanical, or physical changes to the interface apparatus.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

What is claimed is:

1. The method by which each active module of a token passing local area network which satisfies IEEE Standard 802.4 communicates over a pair of cables, with each module transmitting the same signals over both cables and receiving signals transmitted over the cables from only one of the cables at a given time, the cable from which a module receives signals at any given time being designated as that modules selected cable and the second cable being its redundant cable, with the selected cable of all modules being the same cable when the network is operating properly; each module has the capability of detecting a fault in its selected cable, of switching to its second cable and of initiating the reestablishment the network with the second cable as the selected cable of the modules of the network; said method comprising the steps of:
  checking to determine if a module's selected cable has a fault; and
  a module detecting a fault in its selected cable switching cables to receive signals from its second cable;
  the other modules in response to a module of the network initiating re-establishing the network; switching to their second cable, so that the second cable becomes the selected cable of the modules of the network.

2. The method of claim 1, in which a fault in a cable is silence for a predetermined period of time.

3. The method of claim 2, in which a fault in a cable is the presence of noise exceeding a predetermined threshold.

4. The method of claim 3 further comprising the steps of each module periodically checking its selected cable to determine if low level noise below the threshold recited in claim 3, is present on its selected cable; identifying the cable as being noisy; and switching to its redundant cable if its redundant cable is not identified as being faulty.

5. The method of claim 4 further comprising the steps of a module in a listening mode of operation periodically checking to determine if signals received from its selected cable are valid; and switching to its redundant cable if it is not receiving valid signals.

6. The method of claim 5 further comprising each module periodically checking its redundant cable, if its redundant cable has been identified as being silent, to determine if signals are presently being transmitted over its redundant cable.

7. In a token passing local area network having a plurality of modules which network and modules satisfy IEEE Standard 802.4 and which modules communicate over a pair of cables, with each module transmitting the same signals over both cables and receiving signals transmitted over the cables from only one of the cables at a given time, the cable from which a module receives signals at any given time being designated as that modules selected cable and the other, or second, cable being the redundant cable, with each module including a token bus controller (TBC) that produces interrupts when certain conditions are detected; the improvements comprising the method by which interrupts produced by a TBC are serviced; said method comprising the steps of:
  1. in response to a TBC producing a bus idle time-out interrupt;
    a, checking to see if the redundant cable has a fault;
    b, if not, switching cables and checking to see if valid signals have been received from the second cable, and
    c, if valid signals have been received, returning from the interrupt;
  2, in response to a TBC producing a noise/frame fragment counter interrupt;
    a, switching to the redundant cable ; and
    b, returning from the interrupt;
  3, in response to a TBC producing a successor change interrupt, a claim token interrupt, a win address sort interrupt, or a lost address sort interrupt;
    a, switching to its redundant cable; and
    b, returning from the interrupt.

8. The method of claim 7 in which a fault in a cable is silence for a predetermined period of time.

9. The method of claim 8 in which a fault in a cable is the presence of noise exceeding a predetermined threshold.

10. The method of claim 9 in which each module includes a timer which periodically produces a timer interrupt and which further comprises the steps of:
  1. in response to said timer producing a timer interrupt;
    a, checking its selected cable to determine if low level noise below the threshold recited in claim 9 is being received;
    b, identifying its selected cable as being noisy;
    c, switching to its redundant cable; and
    d, returning from the interrupt.

11. The method of claim 10 which further comprises the steps of:
  1. a module in the listening mode of operation in response to said timer producing a timer interrupt;
    a, checking to determine if signals received from its selected cable are valid;
    b, switching to its redundant cable if the signals are not valid; and
    c, returning from the interrupt.

12. The method of claim 11 which further comprises the steps of:
  1. a module whose redundant cable has been identified as having a fault as defined in claim 8, in response to a timer fault
    a, checking to determine if its redundant cable is presently silent;
    b, reporting that its redundant cable is silent if it is; and
    c, returning from the interrupt.

13. A method by which each module of a token passing LAN detects a fault in a first cable from which each module receives signals, each modules selected cable, and switches to a second redundant cable from which to receive signals, and reestablishes the LAN with all modules receiving signals from the redundant cable, an active module both transmitting and receiving signals and a passive module only receiving signals; by executing a plurality of subroutines comprising the steps of:
  subroutine 1,
    (a) switching to the second cable if no signals are received from the first cable for a first period of time;
    (b) testing the second cable to determine if valid sets of signals are being received from the second cable for a second period of time;
    (c) terminating subroutine 1 if valid sets of signals are received in step b;
    (d) repeating steps a and b if no valid sets of signals are received in step b until terminated by step c or until a third period of time has elapsed;
    (e) terminating subroutine 1 when the third period of time has elapsed;
    (f) testing to determine if any signals have been received during said first period of time after step e is completed;
    (g) if valid sets of signals are received in step f, continuing to receive signals from the same cable for a fifth period of time and terminating subroutine 1;
    (h) if no signals are received in step f, testing to determine if any signals have been received during the most recent fifth period;
    (i) if signals were received during the most recent fifth period, terminating subroutine 1;

(j) if no signals were received during the most recent fifth period, switching cables and terminating subroutine 1;

subroutine 2, (k) determining if the cable from which a module is receiving signals is noisy;

(l) switching cables if the cable is determined to be noisy; and (m) terminating subroutine 2 after completing step 1; subroutine 3, (n) switching to the second cable any time a module begins the process of re-establishing the LAN; and (o) terminating subroutine 3; and subroutine 4

(p) each active module periodically checking the cable from which it is receiving signals for low level noise;

(q) terminating subroutine 4 if the noise level of its selected cable is acceptable;

(r) switching to the redundant cable if the noise level of the received signals exceeds a predetermined threshold; and (s) terminating subroutine 4.

14. The method of claim 13 which further comprises the steps of a passive module periodically checking to determine if it is receiving valid signals from its selected cable, switching cables if it is not, and terminating execution.

15. The method of claim 14 which further comprises the steps of an active module periodically checking its redundant cable, which has been determined to be silent, to detect if it is presently functioning properly, and reporting it to be silent if it remains silent.

* * * * *